United States Patent
Pachler

(10) Patent No.: US 9,931,941 B2
(45) Date of Patent: Apr. 3, 2018

(54) CURRENT TRANSMISSION DEVICE

(71) Applicant: SCHUNK BAHN- UND INDUSTRIETECHNIK GMBH, Wettenberg (DE)

(72) Inventor: Alexander Pachler, Salzburg (AT)

(73) Assignee: SCHUNK BAHN-UND INDUSTRIETECHNIK GMBH, Bergheim (AT)

( * ) Notice: Subject to any disclaimer, the term of this patent is extended or adjusted under 35 U.S.C. 154(b) by 121 days.

(21) Appl. No.: 14/911,487

(22) PCT Filed: Aug. 12, 2013

(86) PCT No.: PCT/EP2013/066839
§ 371 (c)(1),
(2) Date: Feb. 11, 2016

(87) PCT Pub. No.: WO2015/022008
PCT Pub. Date: Feb. 19, 2005

(65) Prior Publication Data
US 2016/0185227 A1    Jun. 30, 2016

(51) Int. Cl.
*H02J 7/00* (2006.01)
*B60L 5/30* (2006.01)
*B60L 11/18* (2006.01)

(52) U.S. Cl.
CPC ............. *B60L 5/30* (2013.01); *B60L 11/1816* (2013.01)

(58) Field of Classification Search
CPC ....... Y02E 60/12; H02J 7/0042; H02J 7/0045; H01M 10/46; H01M 10/44
USPC ......................................................... 320/107
See application file for complete search history.

(56) References Cited

U.S. PATENT DOCUMENTS

| | | | |
|---|---|---|---|
| 2003/0163228 A1* | 8/2003 | Pillar ................. | A62C 27/00 701/1 |
| 2005/0228257 A1* | 10/2005 | Ishikawa ............ | G02B 21/0012 600/407 |
| 2011/0074351 A1* | 3/2011 | Bianco .............. | B60L 11/1816 320/109 |
| 2011/0077809 A1* | 3/2011 | Leary ................ | B60L 11/1824 701/22 |
| 2011/0233018 A1* | 9/2011 | Richards .............. | B60L 5/005 191/45 R |
| 2012/0013743 A1* | 1/2012 | Tanarro Marquez ..... | B60L 5/26 348/148 |
| 2017/0136897 A1* | 5/2017 | Ricci .................. | B60L 11/182 |

FOREIGN PATENT DOCUMENTS

| | | |
|---|---|---|
| CH | 96 411 A | 10/1922 |
| DE | 424 801 C | 2/1926 |
| EP | 0356835 A2 | 3/1990 |
| GB | 2 357 482 A | 6/2001 |
| JP | H03 164002 A | 7/1991 |
| WO | 2007143998 A1 | 12/2007 |

OTHER PUBLICATIONS

International Search Report dated Jun. 16, 2014 in connection with PCT/EP2013/066839.
PCT English Language Translation of the International Preliminary Report on Patentability, PCT/EP2013/066839, dated Feb. 25, 2016.

* cited by examiner

*Primary Examiner* — Arun Williams
(74) *Attorney, Agent, or Firm* — Quarles & Brady LLP

(57) ABSTRACT

The invention relates to a current transmission device for stationary charging of electrical energy stores of devices and/or for mobile supplying of electrical drive units of devices having a current transmitter which is embodied as an articulated arm system, and which can swivel between a current-transmitting extended position and a current flow interrupting retracted position, an adjusting drive interacting with the current transmitter as well as a spring system interacting with the current transmitter, wherein the adjusting drive is self-locking-free and has a switchable electromagnetic brake device.

7 Claims, 2 Drawing Sheets

Fig. 1
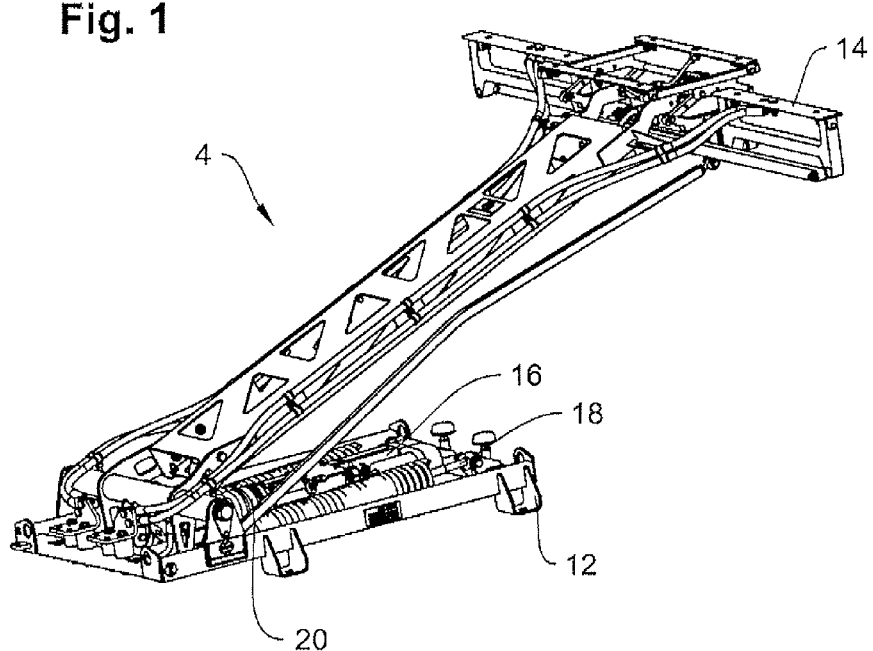
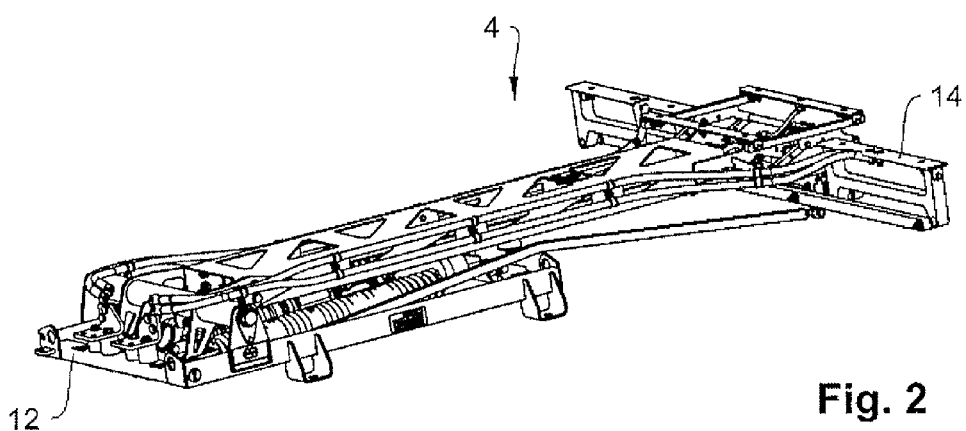
Fig. 2

CURRENT TRANSMISSION DEVICE

CROSS-REFERENCE TO RELATED APPLICATIONS

This application represents the national stage entry of PCT International Application No. PCT/EP2013/066839 filed Aug. 12, 2013; which is hereby incorporated herein by reference for all purposes.

The invention relates to a current transmission device for stationary charging of electrical energy stores of devices and/or for mobile supplying of electrical drive units of devices.

Current transmission devices of the type mentioned at the beginning are, for instance, arranged on railway vehicles or buses for mobile supplying of electrical drive units of the railway vehicles. Such current transmission devices are likewise arranged at stationary charging current devices for boost charging of energy stores. The current transmission devices comprise a frame, with the aid of which they are attached to a fixed structure, such as the roof of railway vehicles or buses. A current transmitter that is embodied as a cantilever beam is arranged at the frame, said current transmitter being able to swivel between a current-transmitting extended position and a current flow interrupting retracted position. For mobile supplying of electrical drive units and for stationary charging of energy stores, contact faces that are arranged at the current transmitter have contact with a matching contact. The matching contact may, for instance, be an overhead cable being arranged along the railway lines of the railway vehicle or along the driveway of the bus. It may, however, also be arranged at a charging current device and above the device. The known current transmission devices furthermore comprise an adjusting drive, which swivels the current transmitter between its extended position and retracted position. In addition, a spring system interacts with the current transmitter, which system biases the current transmitter in the direction of its extended position or of its retracted position. Such a spring system secures, for instance, a contact with an overhead cable if the device, such as a bus, changes its distance to an overhead cable due to unevennesses of road.

Adjusting drives of current transmission devices to date mostly have been realised as spindle motors. Said motors, however, are problematic, especially regarding their behaviour when they are switched off or when a fault or a power outage occur.

In order to prevent the spindle from being retracted or extended, caused by the spring tension, when the motor has been turned off, adjusting drives or spindle motors that have been used until now are self-locking. When using a spindle motor, a mechanical brake apparatus, such as a coil-spring braking mechanism, is mostly used at the threaded spindle.

The brake that has been known until now is, however, especially an obstacle for quickly reaching the extended position of the current transmitter. The extending speed of the current transmitter is substantially influenced by the speed of the adjusting drive. When employing a spindle motor, the self-locking of the threaded spindle or the mechanical brake prevents the current transmitter from being quickly extended.

It is, however, particularly desirable that the current transmitter is quickly extended like this because the current transmitters, in the context of boost charging applications, have to be guided to the contact point or overhead cable very quickly, in order to guarantee a large amount of time for the charging process during a given non-operation period of the device or of the vehicle.

The invention is now based on the object of creating a current transmission device for stationary charging of electrical energy stores of devices and/or for mobile supplying of electrical drive units of devices, which realises that the current-transmitting extended position is reached quickly.

Said object is attained by a current transmission device having the features of claim 1.

In accordance with the invention, a current transmission device for stationary charging of electrical energy stores of devices and/or for mobile supplying of electrical drive units of devices is proposed. Said current transmission device comprises a frame for arranging the current transmission device at the device, a current transmitter which is arranged at the frame and is embodied as an articulated arm system, and which can swivel between a current-transmitting extended position and a current flow interrupting retracted position, an adjusting drive interacting with the current transmitter and a spring system interacting with the current transmitter. The current transmission device in accordance with the invention is characterised in that the adjusting drive is self-locking-free and in that an electromagnetic brake device is envisaged, which is realised so as to be switchable, such that it either unblocks the swivel movement of the current transmitter or defines a position of the current transmitter.

The advantage of a self-locking-free adjusting drive is that the same, when the energy supply is turned off, can be adjusted by external force, such as the spring forces of the spring system, and that the current transmitter may hence be adjusted with respect to its lifted position. The spring system, when the adjusting drive has been turned off, transfers the current transmitter into a position corresponding to a minimum energy state of the spring system. This means that, depending on the arrangement of the spring system, it is possible to swivel the current transmitter, when the adjusting drive has been turned off, into its current-transmitting extended position or its current flow interrupting retracted position.

However, in order to fix the current transmitter, when the adjusting drive has been turned off, in a position, an electromagnetic brake device is envisaged. By way of the current transmission device in accordance with the invention, is it now possible to realise a current-transmitting to extended position in a quick manner and to unblock or to block a swivel movement of the current transmitter when the self-locking-free adjusting drive has been turned off.

In a preferred embodiment of the current transmission device according to the invention, the electromagnetic brake device is realised as a closed-circuit brake and unblocks the swivel movement of the current transmitter by applying voltage. Advantageously, such a brake device is open then and does not deploy a braking action if the adjusting drive is supposed to be advanced. If a closed-circuit brake is excited, the same opens and lets a movement of the current transmitter and of the spindle happen. If the excitation is interrupted, the closed-circuit brake is closed and prevents any further movement from happening.

It is particularly advantageous if a current transmission device having a brake device that is realised as a closed-circuit brake is arranged at a device that is realised as a vehicle, such as a railway vehicle or a bus, preferably on the roof. In its current flow interrupting retracted position, the current transmitter, when the brake is closed, is fixed in this position against the spring force of the spring system. For lifting the current transmitter from its retracted position into its current-transmitting extended position, voltage is applied to the closed-circuit brake, such that the same unblocks the swivel movement of the current transmitter. By spring force, the spring system pulls the current collector into its extended position. Here, it is conceivable to accelerate the procedure of extending the current transmitter by supporting the adjusting drive. Since the adjusting drive is self-locking-free, it is possible to realise, when the brake is open, a quick adjustment of the current transmitter from its retracted position into its extended position. When the extended position is reached, a current being transmitted in said position, the voltage that has been applied to the closed-circuit brake is removed, such that the same is closed and that the current transmitter is fixed in its extended position or may move in its region of operation. By way of to the spring force of the spring system, the current transmitter is pressed against a matching contact, such as an overhead cable.

For swivelling the current collector from its extended position into its retracted position, voltage is again applied to the closed-circuit brake, such that the same opens and that the adjusting drive may advance the current transmitter into its retracted position. As soon as the retracted position has been reached, the adjusting drive stops and the closed-circuit brake closes due to the fact that the applied voltage is removed.

In another preferred embodiment of the current transmission device according to the invention, the electromagnetic brake device is realised as an open-circuit brake and applying voltage defines the position of the current transmitter.

A current transmission device having a brake device that is realised as an open-circuit brake and that is arranged at a stationary device, such as a stationary charging current device, is particularly advantageous. When employing such a charging current device, the current transmission device is arranged at a station/stop or at a boost charging point. The current transmitter swivels from its retracted position into its extended position from the top downwards, in the direction of the device. There, the device may for instance be a railway vehicle or a bus. In its retracted position, the current transmitter has been retracted above a device region and a current flow to a device has been interrupted. The retracted position of the current transmitter is realised using the spring force of the spring system, which biases the current transmitter in the direction of its retracted position. For establishing the extended position, a non-excited state of the open-circuit brake is established, such that the same is open and unblocks a swivel movement of the current transmitter. The adjusting drive advances the current transmitter into its extended position until the contacts on the side of the current transmitter establish a current flow with the contacts on the side of the device. In order to charge the electrical energy stores of the device, the current collector remains in its extended position. Said extended position is fixed in that a voltage is applied to the open-circuit brake, which closes because of this and fixes the extended position.

For interrupting the contact and for retracting the current transmitter from its extended position, the voltage that has been applied to the open-circuit brake is removed, whereby the open-circuit brake opens and the spring system swivels the current transmitter into its retracted position. This swivel movement may be supported by the adjusting drive. This embodiment is particularly advantageous when a drive device has been switched off or, for instance, when a power outage occurs. During the charging process, the device is connected to the stationary device by way of the extended current transmitter. If the power goes off, the voltage that has been applied to the open-circuit brake is omitted, such that the open-circuit brake opens. The self-locking-free adjusting drive, in its laid-out state, lets a movement happen, such that the spring system swivels the current transmitter into its retracted position and that the contact to the device is interrupted.

It is particularly advantageous if the brake device has an energy supply that is independent of the adjusting drive. In this way, it is, for instance, possible, in case of a current interruption, such as a power outage, to supply emergency power to the brake device, in this way managing that an extended position of the current transmitter is still guaranteed, despite the power outage.

Alternatively, it is possible that the brake device and the adjusting drive have a common energy supply that interacts with a switching device.

In a particularly preferred embodiment of the current transmission device, the current transmitter is realised so as to be able to swivel both towards the ground, towards the sky, horizontally and in an intermediate direction resulting therefrom. By way of such a variability with respect to the direction of swivelling, it is possible to adapt the current transmission device in accordance with the invention to an installation situation, depending on the intended use.

It is likewise advantageous that the brake device comprises a manipulation device, using which the brake device can be actuated manually. There, the manipulation device may, for instance, be a lever or a remote control pulley, which actuates the brake device. It is also conceivable to envisage an electrical emergency energy store formed from accumulator batteries or from capacitors and being activated by a manipulation device that is embodied as a crank handle.

Exemplary embodiments of a current transmission device are illustrated in the drawing in a schematically simplified fashion and will be explained in greater detail hereinafter. In the figures:

FIG. 1 shows a current transmission device in accordance with a first embodiment in an extended position;

FIG. 2 shows the current transmission device illustrated in FIG. 1 in a retracted position;

Figure 3:
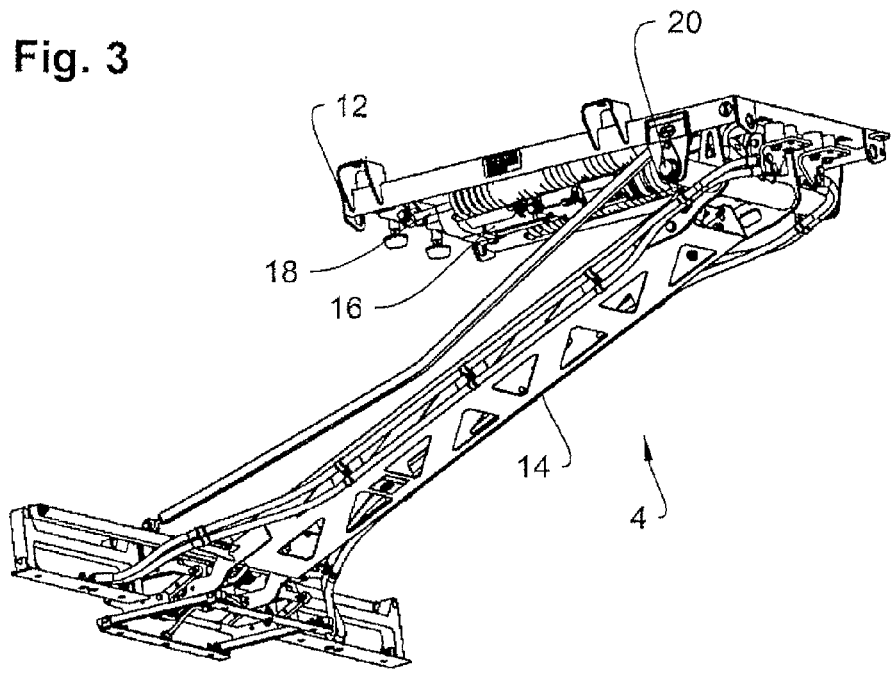
FIG. 3 shows a current transmission device in accordance with a second embodiment in an extended position.

FIGS. 1 and 2 show a current transmission device 4 for stationary charging of electrical energy stores of devices, such as buses or railway vehicles. The current transmission device 4 comprises a frame 12, with the aid of which the same is arranged at a roof region of a device. A current transmitter 14 that is embodied as an articulated arm system is arranged at the frame 12. The current transmitter 14 is borne so as to be swivelable on the side of the frame and has contacts at its side facing away from the frame 12, using which contacts an electrically conductive connection to, for instance, an overhead cable can be established. The current transmitter 14 can swivel between a current-transmitting extended position, as it is depicted in FIG. 1, and a retracted position for interrupting the electrically conductive connection, as it is depicted in FIG. 2. An adjusting drive 16 interacts with the current transmitter 14, said adjusting drive being realised as a spindle motor 16. In addition, a spring system 18 is arranged at the frame 12, said spring system likewise interacting with the current transmitter 14 and biasing the same in the direction of its extended position. At the spindle nut that is arranged on the spindle of the spindle motor 16, an electromagnetic brake device 20 is envisaged, which is realised as a closed-circuit brake.

The current transmitter 14 is fixed in its retracted position using the closed-circuit brake. For swivelling the current transmitter 14 from its retracted into its extended position, voltage is applied to the closed-circuit brake, such that the same opens and that the current transmitter 14 swivels into its extended position by way of the spring force of the spring system 18. As soon as the extended position has been reached, voltage is again applied to the closed-circuit brake, such that the same closes again.

The current transmitter 14 is swivelled from its extended position into its retracted position in that the closed-circuit brake is opened by again applying voltage and in that the spindle motor 16 swivels the current transmitter 14.

Figure 4:
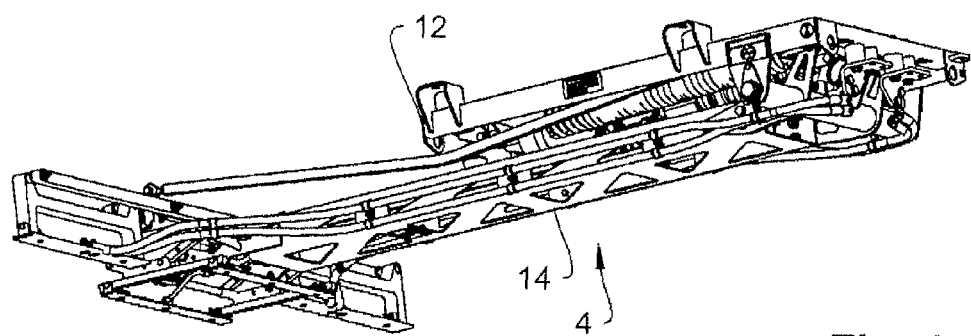
FIG. 4 shows the current transmission device illustrated in FIG. 3 in a retracted position.

The current transmission device 4 depicted in FIGS. 3 and 4 largely corresponds to the current transmission device depicted in FIGS. 1 and 2, but instead of the closed-circuit brake, an open-circuit brake is arranged at the adjusting drive or spindle motor 16. Such a current transmission device 4 may, for instance, be stationarily arranged at a charging point. There, the current transmission device 4 arranged at the charging point in such a manner that it reaches over a region into which a device, such as a bus or a railway vehicle, may be retracted.

For adjusting the current transmitter 14 from its retracted position illustrated in FIG. 4 into its extended position illustrated in FIG. 3, voltage that has been applied to the open-circuit brake is removed, such that the open-circuit brake opens. As soon as the swivel movement of the current transmitter 14 has been unblocked, the adjusting drive or the spindle motor 16 advances the current transmitter 14 into its extended position. When the extended position of the current transmitter 14 has been reached, voltage is again applied to the open-circuit brake, such that it closes again and blocks the current transmitter 14 in its extended position.

The current transmission device illustrated in FIGS. 3 and 4 has a FAILSAFE function. If a power outage occurs, it is even possible to swivel the current transmitter 14 from its extended into its retracted position if all electrical energy supplies stop working. Because of this, it is possible to remove a device, such as a railway vehicle or a bus, from it position under the current transmission device 4 when a power outage occurs. The FAILSAFE function is realised in that the open-circuit brake opens when there is no voltage anymore or when it is not excited. Since the current transmitter 14, using the spring system 18, is biased in the direction of its retracted position, the current transmitter 14 swivels into its retracted position.

The invention claimed is:

1. A current transmission device, said current transmission device comprising:
   a frame;
   a current transmitter arranged on the frame and including an articulated arm system that swivels said current transmitter between a current-transmitting extended position and a current flow interrupting retracted position;
   a self-locking free adjusting drive driving the current transmitter between the current-transmitting extended position and the current flow interrupting retracted position; and
   a spring system biasing the current transmitter toward the current flow interrupting retracted position; and
   an electromagnetic brake device arranged at the adjusting drive, said brake device being either a closed-circuit brake device that unblocks swivel movement of the current transmitter when a voltage is applied to the closed-circuit brake device or an open-circuit brake device that defines a position of the current transmitter when a voltage is applied to the open-circuit brake device.

2. The current transmission device according to claim 1, in which said frame is fixed to a vehicle.

3. The current transmission device according to claim 1, in which said frame is fixed to a stationary charging current device.

4. The current transmission device according to claim 1, in which the brake device has an energy supply that is independent of an energy supply of the adjusting drive.

5. The current transmission device according to claim 1, in which the brake device and the adjusting drive have a common energy supply that interacts with a switching device.

6. The current transmission device according to claim 1, in which the current transmitter can swivel downwardly, upwardly, horizontally, and in an intermediate direction resulting therefrom.

7. The current transmission device according to claim 1, in which the brake device includes a manipulation device manually actuating the brake device.

* * * * *

UNITED STATES PATENT AND TRADEMARK OFFICE
CERTIFICATE OF CORRECTION

PATENT NO. : 9,931,941 B2
APPLICATION NO. : 14/911487
DATED : April 3, 2018
INVENTOR(S) : Alexander Pachler Page 1 of 1

It is certified that error appears in the above-identified patent and that said Letters Patent is hereby corrected as shown below:

In the Specification

Column 2, Line 46, "current-transmitting to" should be --current-transmitting--.

Column 3, Line 16, "of to the" should be --of the--.

Signed and Sealed this
Fifth Day of June, 2018

Andrei Iancu
*Director of the United States Patent and Trademark Office*